Nov. 23, 1965   E. RÖSCH   3,219,894
DEVICE FOR AUTOMATICALLY ADJUSTING A MACHINE PART
Filed May 2, 1962   4 Sheets-Sheet 3

INVENTOR
Eduard Rösch
BY
ATTORNEY

United States Patent Office 3,219,894
Patented Nov. 23, 1965

3,219,894
DEVICE FOR AUTOMATICALLY ADJUSTING A MACHINE PART
Eduard Rösch, Le Locle, Neuchatel, Switzerland, assignor to Dixi S.A. Machines outils Usine II, Le Locle, Neuchatel, Switzerland
Filed May 2, 1962, Ser. No. 191,986
Claims priority, application Germany, Apr. 12, 1960, D 33,099
14 Claims. (Cl. 318—18)

This application is a continuation-in-part of application Serial No. 100,858, filed April 5, 1961, now abandoned.

This invention relates to a method and apparatus for automatically adjusting a machine part into a position corresponding to a digitally preselected value or measure.

A method of this type is known, wherein the number of divisions of a scale located at one side of a reference sign and this reference sign respectively are repeatedly scanned by electro-optical means, the train of electric pulses corresponding to the divisions of the said scale being cut off by a reference pulse corresponding to the scanning of the said reference sign, the said trains of electric pulses being repeatedly counted and compared with the said digitally preselected value, and the machine part being adjusted in accordance with any difference between the number of pulse and the said value.

In this prior method a scale portion and a reference sign provided on transparent carriers are scanned by means of two synchronously deflected light beams, the light of each beam acting onto a photoelectric cell so that variations of the light intensity result in corresponding variations of the voltage and/or current produced by the photoelectric cells.

This prior method has a number of drawbacks. Deflection of the light beams has to be effected by mechanical means, this being unreliable and complicated. It is difficult to deflect both light beams in absolute synchronism. As mentioned above, the carriers for the scale portion and the reference sign or signs have to be made of transparent material, and it is difficult to find transparent materials of sufficient stability and strength for carrying long scales. Since the scales and reference signs are directly scanned by the primary light source, it is impossible to optically magnify the scale portion or the reference sign or signs before scanning them. For this reason the scale division has to be equal to the required adjusting precision. As an example, when an adjusting precision of $\frac{1}{1000}$ mm. is required the scale division has to be $\frac{1}{1000}$ mm. and the width of the division lines of the scale has to be in the order of $\frac{1}{2000}$ mm. It is extremely difficult to precisely produce a scale of this fineness and it is further hardly possible to produce a scanning light beam of the same sharpness, that is of a width in the order of $\frac{1}{2000}$ mm., this being a requirement to properly read a scale of the above fineness.

It is the primary object of this invention to remove the above drawback of the known method, this invention consisting broadly in that a picture of the said scale and of the said reference sign is produced by optical means and that this picture is electronically scanned, for instance by means of a cathode ray tube, each individual scanning being effected by one single deflection of one single electron beam. Since an optical image of the scale divisions and of the reference sign or signs must be produced for allowing scanning of such a picture by a picture tube or the like, the carriers of the scale and of the reference sign or signs may be made of any desired material. In any case, the scale and reference sign or signs may be magnified when forming the image thereof, so that a sufficient resolving power is obtained with an electron ray focussed to the usual degree. No mechanical deflection of light beams is required. The scale and reference sign or signs may be scanned by means of one single electron beam so that synchronisation of two separate beams is not required. Since an optical magnification of the reference sign or signs and of the scale is usually possible and advantageous, the scale having a finer division may preferably be fixed at a suitable place of the optical system and the division of this scale may be coarser than would be required by the desired adjusting precision. It is evident that a coarser scale is easier to be produced than an extremely fine scale. A similar improvement is possible by electronic subdivision of the intervals between succeeding output signals of the picture tube, whereby the adjusting precision may be increased by a factor equal to the factor of subdivision.

Although it is known to adjust a machine part by continuous comparison of the relative position of two similar pictures by means of an image-converter tube having no deflecting means and no deflectable electron beam, this system could not possibly be used for scanning a scale and a reference sign or signs due to the lack of deflecting means and a proper scanning electron beam. Further, comparison of two similar pictures has nothing to do with counting scale divisions and comparing the counting result with a digitally preselected and electrically stored value as proposed by this invention.

This invention also relates to a device for carrying out the above method, whereof one embodiment is illustrated by way of example in the accompanying drawings in which
FIG. 2 shows the means for scanning the scale,
FIG. 3 is an illustration of the picture to be scanned.

Figure 1:
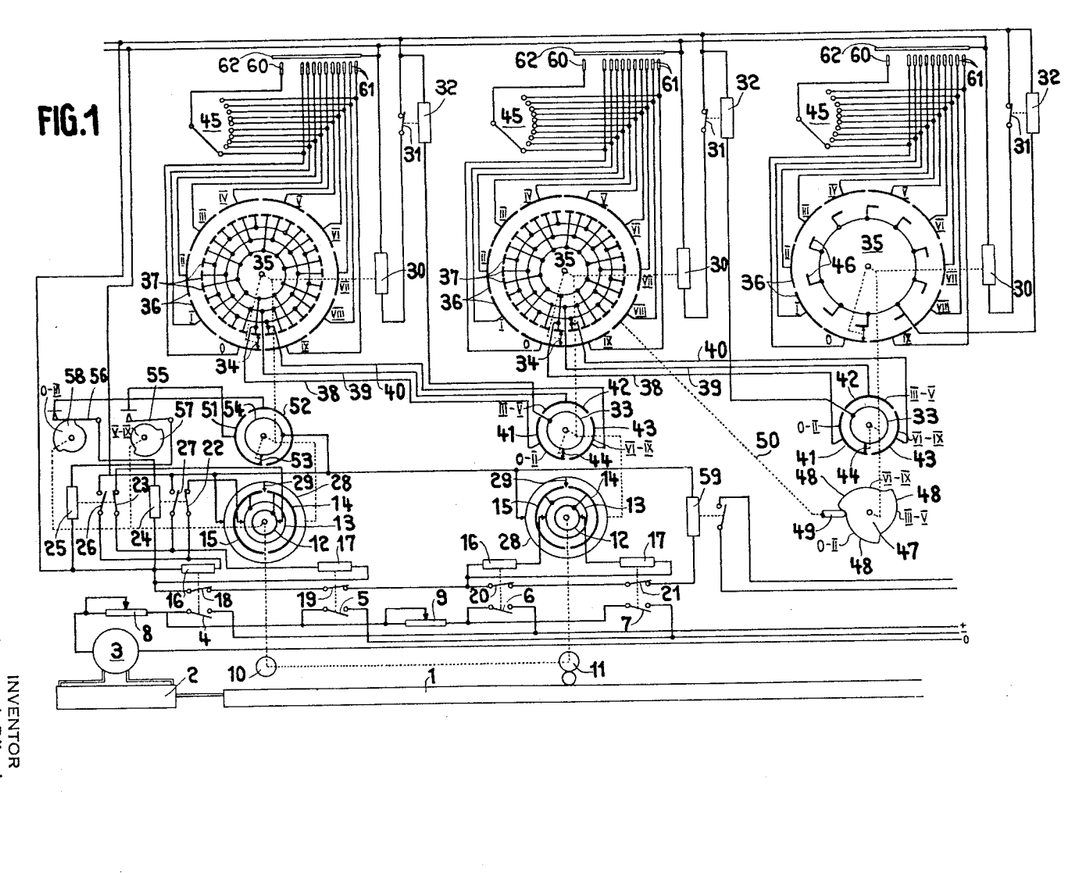
FIG. 1 is a diagram of the coarse-adjusting apparatus.

The illustrated device serves for adjusting a machine part 1, for instance the chuck table of a machine tool. With reference to FIG. 1 the coarse adjustment of the table 1 will first be explained whereby it is assumed that the table 1 is only movable in horizontal straight direction with a total stroke of about 8 cm. The table is displaced by means of a hydraulic cylinder 2 which is controlled in a well known manner by an electrovalve 3. This valve 3 may alternatively be energized through relay contacts 4 to 7 from current sources of different polarity, whereby the valve 3 and the displacing cylinder 2 respectively are actuated in the one or other direction according to the direction of the current flowing in the valve solenoid. Variable resistors 8 and 9 are series-connected with the relay contacts 4, 5 and 6, 7 respectively, such resistors allowing adjustment of the current flowing in the valve solenoid and of the flow of pressure oil through the valve which depends on the current intensity.

A toothed rack not shown in the drawing is connected to the table 1, this rack gearing with a schematically indicated gear system comprising wheels 10 and 11. The wheel 10 is rotated by $\frac{1}{10}$ of a full revolution, that is, by one unit step when the table is displaced by 1 cm., while the wheel 11 is rotated by $\frac{1}{10}$ of a full revolution, that is, by one unit step when the table is displaced by 1 mm. Of course, further similar decades may be provided for extending the table stroke from about 8 cm. to 8 dm. or 8 m.

Each of two systems of slip rings 12 and 13 electrically connected to half-circular contact segments 14 and 15 respectively, is mechanically coupled with one of the wheels 10 and 11 respectively. A pair of relays 16 and 17 is associated with each decade, such relays controlling the contacts 4 to 7 and interlocking contacts 18 to 21. By means of brushes the relays 16 and 17 of the millimeter decade (wheel 11) are directly connected to the slip rings 13 and 12 respectively, while the relays 16 and 17 of the centimeter decade (wheel 10) are connected to the slip rings 13 and 12 through rest or breaking contacts 22 and 23 respectively of relays 24 and 25 respectively. Further, relays 16 and 17 of the centimeter decade may directly be connected to a current source by means of making contacts 26 and 27 of relays 25 and 24 respectively. To the same current source slip rings 28 may be connected through suitable brushes, such slip rings 28 also being connected to a brush 29 adapted to run along segments 14 and 15 of the associated decade.

By pointed lines the mechanical connection between the slip rings 28 and other parts later referred to are indicated, the lines showing further that the individual groups of so interconnected members may be operated by means of a stepping relay or electromagnet 30. Each of the stepping relays 30 is series connected with a breaking contact 31 of a relay 32 connected to a slip ring 33 of a commutator associated with the next lower decade.

The stepping relays 30 operate brushes 34 of selectors 35 having an outer rim of contact segments 35 designated 0–IX. Three inner contact segments 37 are associated with each outer segment 36, whereby each group of three inner segments is connected in cyclic sequence to three conductors 38, 39 and 40. These conductors 38, 39 and 40 are connected to three segments 41, 42 and 43 respectively of a commutator of the next lower decade, such segments covering each an angle of practically 120°. Brushes 44 are provided between the segments 41 to 43 and the slip rings 33, such brushes 44 being displaced together with the brushes 34 of the selectors 35 as indicated by the pointed lines.

A preselector 45 is associated with each decade, one of the segments 36 of the associated selector 35 being put into circuit according to the position of the preselector 45.

The decade allowing preselection and adjustment of tenths of millimeters, shown at the right in FIG. 1, differs from the other decades in that only one inner contact segment is associated with each outer segment 36 of the selector 35. Further, a cam disc 47 is connected to the stepping relay 30, this cam disc having three similar cam portions 48 staggered by 120°. The cam disc 47 cooperated with a spring-loaded pin 49 connected to a lever or any other suitable mechanism schematically indicated in FIG. 1 by a pointed line 50, this mechanism acting onto the stator of the selector 35 carrying the segments 36 and 37. This stator is slightly turned in clockwise direction from the position shown in FIG. 1 when the pin 49 is lifted by one of the cam portions 47 from its lowest position shown in the drawing. Roman ciphers indicate that the selector positions 0–II, III–V and VI–IX are associated with the individual cam portions 47.

The centimeter decade, that is the last decade, also differs from the millimeter decade which may be considered as a standard equipment adapted to be inserted in any desired number between the lowest and highest decade. The last decade differs in that a commutator with two substantially semi-circular segments 51 and 52 of slightly differing length is used instead of the commutators 33 and 41–44. The segments 51 and 52 may be connected to a slip ring 54 by means of a brush mechanically coupled with the stepping relay of the centimeter decade. The slip ring 54 is connected to a current source while the segments 51 and 52 are connected to cam-operated switches 55 and 56 controlling the relays 25 and 24. As indicated by the pointed mechanical connections the cams 57 and 58 associated with switches 55 and 56 are driven from the wheel 10, and Roman ciphers indicate for which position of the wheel 10 and the table 1 respectively the switches 55 and 56 are closed.

The interlocking switches 18 to 21 are series connected with a relay 59 having a contact for transmitting a control pulse to a fine-adjusting equipment described later on, when all the switches 18 to 21 are closed.

For the sake of a full understanding it should be noted that the input lines of the preselector 45 and to the selectors 35 are shown as being disconnected from the current source. This is to show that there are two possibilities of preselection. The one consists in inserting a punched card between the input contacts 60 and 61 and the bus bar 62 for preselection. When a connection between the bare 62 and one of the contacts 61 is established the preselector will subsequently run into the position destined by this connection. However, when the punched card only allows connection between the bus bar 62 and the contact 60, the selector will subsequently run to any position preselected by the hand-operable preselector switch 45.

The coarse-adjusting equipment is shown in its rest position, wherein all the selectors and control switches are in their zero position and whereby it is assumed that the table 1 has returned to its zero position. In the following description of the coarse adjustment reference will always be had to displacement of the table to the right or to the left, whereby it is assumed that the right-hand relays 17 will cause displacement to the right when excited while the left-hand relays 16 will cause displacement to the left when excited. Displacement of the table to the right is equivalent to displacement in the sense of increasing measures.

When it is desired to displace the table 1 from its zero position corresponding to the measure "zero" to any other position the desired cipher is adjusted for each decade either by insertion of a punched card between the bus bar 62 and the contacts 61 or by manual adjustment of the hand selector 45. The coarse adjustment will be effected at a precision of about 1/10 mm. It is first assumed that the table has to be displaced from its zero position to a position of 6.45 cm., this measure being digitally preselected by insertion of punched cards or by operation of the switches 45, whereby segment $36_{VI}$ will be put into circuit in the centimeter decade, segment $36_{IV}$ will be put into circuit in the millimeter decade and segment $36_V$ will be put into circuit or rendered operative in the decade for selection of the tenths of millimeters.

When the current source is now connected to the equipment by actuation of a start switch not shown in the drawing, the above segments of the selectors are connected to the current source. At the same time all the stepping relays 30 are started up through the still closed relay contacts 31 so that the brushes 34 are displaced along the selector segments 36. When the brush 34 of the tenths-of-millimeter decade touches the preselected segment 36 connected to the current source, the associated relay 32 is energized and the stepping relay is deenergized so that the selector stops in the preselected position. The relays 32 of the higher decades are energized through one of conductors 38 to 40. Therefore, the selectors of the higher decades will eventually stop at a position within reach of their contact segments 36 determined by the position of the brush 44 on one of the segments 41, 42 or 43 of the next lower decade.

When the selector of the lower decade runs to position II, the selector of the next higher decade will stop on the first segment 37 associated with the segment 36. When the selector of the lower decade runs to positions III to V or to position VI to IX, the selector of the next higher decade will run to the center or rear portion of the segment 36. The end position of the millimeter selector shown in the center of FIG. 1 further depends on the position of its stator carrying the segments 36 and 37. In the example it is assumed that the selector of the lowest decade runs to position V so that the pin 49 will touch the upper end of the cam portion 47 associated to selector positions III–V so that the stator of the millimeter selector 35 is shifted in clockwise direction by a maximum amount. Further the brush 44 of the lowest decade will also reach position V and will therefore connect the slip ring 33 with the segment 42. Consequently the selector of the millimeter decade will stop with its brush on the center portion of segment $36_{IV}$ and on the middle segment 37 associated with segment $36_{IV}$ respectively, and since the segments 36 and 37 have been shifted from their initial position by a maximum amount in clockwise direction, the millimeter selector will stop in a position corresponding to the upper part of the center portion of segment $36_{IV}$, this position corresponding to the position V of the lowest decade or to the value 4.5 mm. as adjusted. The centimeter selector 35 is similarly adjusted to a position in the center portion of its contact segment $36_{VI}$.

The brushes 29 and brush 53 of the millimeter decade and centimeter decade respectively have been displaced together with the brushes of the selectors 35. The brush 29 of the centimeter decade will be displaced to the lower end of segment 15 corresponding to six unit steps of the associated selector, whereas the brush 53 will be displaced to the segment 52. The brush 29 of the millimeter decade has been displaced to the lower end of segment 14. The machine table 1 has not yet been displaced during adjustment of the selectors, and the switches 55 and 56 still take the position shown in FIG. 1. Therefore, a current will flow when preselection is completed, from the current source through slip ring 54, brush 53, segment 52, switch 56 and relay 24 so that the contacts 22 and 27 of this relay are changed over. Contact 22 disconnects the segment 15 of the centimeter decade. Relay 17 of this decade is energized through contact 27 of relay 29, and contact 5 of relay 17 connects a negative potential to valve 3 so that the table 1 is displaced to the right. Relay 17 also deenergized relays 16 and 17 of the lower decade by its contact 19. The resistor 8 determines the current flowing through the valve solenoid and consequently the advancing speed of the table 1, it being possible to use a relatively high speed at this stage of the adjusting operation. The wheel 10 is driven by the table in clockwise direction at a speed of one full revolution for a table displacement of 10 cm. Segments 14 and 15 and the switch cams 57 and 58 are driven at the same speed. The brush 29 will soon leave the segment 15 and will change to the segment 14 so that the relay 17 is further energized through segment 14, slip ring 12 and the breaking contact 23 of relay 25, and the table displacement to the right persists. This condition is not changed when after a table displacement of 5 cm. the switch 55 is closed by cam 57, because segment 51 is not touched by brush 53. When the segment 14 has completely passed below the brush 29, relay 17 of the centimeter decade is deenergized and the table is stopped in the middle portion of segment $36_{VI}$ as set out above, because segment 42 of the millimeter decade had become effective, and it is assumed that due to this and to some inertia the table will stop in a position of 6.50 cm.

The segments 14 and 15 of the millimeter decade have been rotated by several full revolutions during the table adjustment described above and will eventually stop in a position where the brush 29 of the millimeter decade which had been advanced by 4 unit steps during the above preselection, touches the segment 15, because the segments 15 and 14 have been rotated to a position corresponding to 5 mm., while the exact position of the brush 29 corresponds to a value of 4.5 mm. Therefore, when relay 17 of the centimeter decade is deenergized at the end of the adjusting operations in that decade, the interlocking contact 19 is closed and the adjustment in the millimeter decade is started up. Under the present assumptions relay 16 of the millimeter decade is energized through brush 29 and segment 15 so that the machine table is displaced to the left from a position of 6.50 cm. into a position of 6.45 mm. When this position is reached, relay 16 of the millimeter decade is deenergized so that relay 59 is energized and a start pulse is transmitted by this relay to the fine adjusting equipment described below.

The coarse-adjusting equipment illustrated in FIG. 1 is so designed that any new adjustment from a position other than zero position will be attained on the shortest way. If, as an example, a new adjustment at 2.87 cm. is to be obtained from the above adjustment at 6.45 cm., the preselectors 45 may for instance manually be adjusted to the new value. The selectors 35 still assume the previously selected positions but will run into the new preselected position upon energization of their stepping relays. For reasons which will now be evident, the brushes 29, 34 and 53 of the centimeter decade will be displaced into the rear or last third of position II. In this way the segment 51 is connected to the current source. Since the table still assumes position VI and the segments 14 and 15 are turned to a corresponding position and therefore are displaced from their zero position in clockwise direction by four unit steps more than the newly adjusted brush 29 the latter will contact segment 15.

Further, switch 55 is closed for table position VI. The relay 25 is energized through segment 51 and switch 55 and directly energizes the return relay 16 of the centimeter decade so that the table is returned towards its zero position at relatively high speed. Relay 16 is also energized through segment 15 and the breaking contact 22. Therefore, when switch 55 is opened upon passage of the table below position V the relay 16 is still energized and continues its return displacement. When position III is reached and the switch 56 is closed no change occurs because the segment 52 connected in series with switch 56 is disconnected. Therefore, the table will only stop in the upper third of position II when the gap between segments 14 and 15 arrives below brush 29. Since the adjustment is attained by a return motion of the table 1 it is assumed that the table stops at a position of 2.8 cm.

The segments 14 and 15 of the millimeter decade have thus attained a position displaced from the zero position in clockwise direction by 8 unit steps. The brush 29 has been adjusted to a position corresponding to 8.7 mm., that is by nearly 9 unit steps and therefore contacts segment 14. Relay 17 of the millimeter decade will be energized through segment 14 and the table 1 will be advanced to a position of 2.87 mm.

Due to the subdivision of each unit step of the selectors 35 of the higher decades and due to the so obtained subdivision of the total selector range into thirty instead of ten steps, it is possible to use the very simple direction indicators comprising two segments 14 and 15 and to obtain direct and accurate adjustment on the shortest possible way. In the highest decade auxiliary switches 55 and 56 are used for determining the starting direction of the table when the table assumes a position above V and has to be displaced to a position below 4 as shown in the above example.

The coarse adjustment has an accuracy of about ⅓ cm. in the centimeter decade and of about ⅓ mm. in the millimeter decade. This last precision is sufficient for going on with the fine adjustment by the fine-adjusting equipment described in the following with reference to FIGS. 2 to 6.

Figures 2, 3, 7, 8:
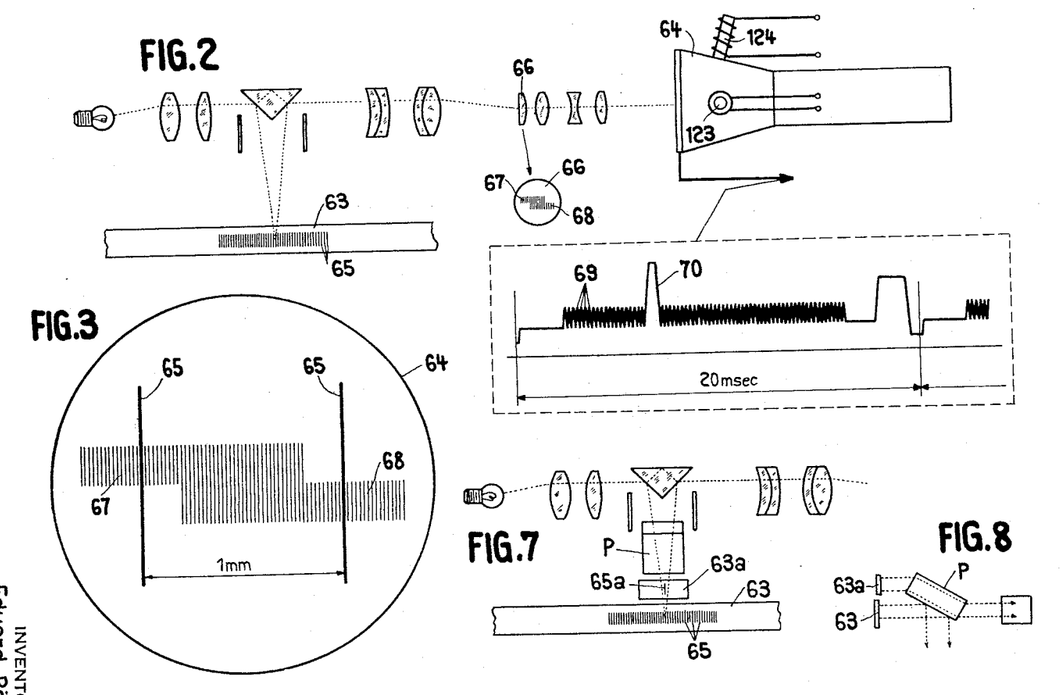

The machine table 1 has a high-precision scale 63 arranged in the direction of displacement of the machine table and divided in millimeters. A small portion of this scale is illuminated and a magnified picture thereof is projected onto the screen of a picture tube 64 by means of an optical system not described in detail. The division lines 65 of scale 63 provided at intervals of 1 mm. are in fact magnified by a factor of 10 and are magnified by a factor of 50 in FIG. 3 of the drawing. A lens 66 of the optical system carries a scale comprising two scale portions staggered in longitudinal and transversal direction. Each of these scale portions 67 and 68 comprises 110 divisions and corresponds to a real length of 1.1 mm. on the scale 63 or 11 mm. on the screen of the picture tube and 55 mm. in FIG. 3 respectively. The distance between neighboring division lines of the scales 67 and 68 corresponds to a real distance of $\frac{1}{100}$ of a millimeter. The scale portions 67 and 68 are shifted in longitudinal direction by 50 scale divisions, this corresponding to an effective displacement by 0.5 mm. As shown in FIG. 3, the reference lines 65 are wider and darker than the division lines of scale portions 67 and 68.

Therefore, when the picture projected onto the screen of the picture tube is scanned along a line or preferably along a narrow zone covering only one of the scale portions 67 or 68, an output signal of the picture tube will be obtained comprising a rapid train of relatively small pulses 69 and of a higher and wider pulse 70 resulting from the picture of one of the division lines 65 of the scale 63, this division line or lines serving as a reference sign in the scale divisions 67 and 68.

A typical train of pulses of this type is schematically illustrated in FIG. 2. This train of pulses is transmitted through an amplifier 71 into two channels, the channel shown on the left in FIG. 4 serving for forming and modifying the pulses 69 while the channel shown in the right serves for selecting and forming the reference pulse 70. Both channels comprise an electronic switch 72 and 73 respectively for selection of the desired measuring period.

Figure 4:
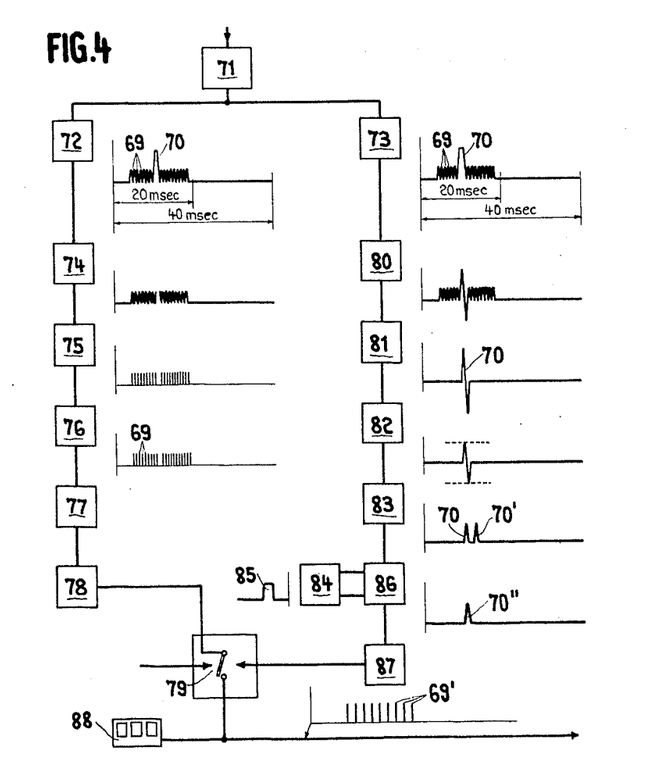
FIG. 4 is a block diagram of the electronic circuit for computing the picture signals.

The left channel further comprises a band-pass filter 74 operating at a mean transmission frequency of 10 kc. the pulses 69 arriving at a sequence in this order of frequency passing through the filter while the wider pulses 70 will not pass through the filter. A pulse-forming stage 75 connected to the output of the band-pass filter 74, wherein pulses with sharp front and rear flanks or with a steep rise and steep decline are produced. In a following delay network 76 the pulses are delayed by about 0.3 milliseconds. The so delayed pulses are then transmitted to a pulse multiplier 77 wherein the frequency of pulse 69 is multiplied by a factor of 10. The pulses are then fed to an amplifier and limiter 78 from where they are transmitted to a schematically illustrated electronic switch 79.

In the channel shown on the right in FIG. 4, a differentiator follows the selector 73. A low pass filter 81 removes the high-frequency pulses 69. The differentiated pulse 70 passing through filter 81 is applied to a gain-controlled amplifier maintaining the pulse amplitude at a constant level. The pulse is then applied to a two-way recifier 83 for producing two similar time-shifted pulses 70 and 70' corresponding to the beginning and the end of the pulses 70 and of the reference lines 65 respectively. The pulses 70 and 70' are then transmitted to an automatic control unit 86, whereby an auxiliary pulse 85 is produced in an auxiliary equipment 85, the rectangular pulse 85 having a duration equal to the time interval between pulses 70 and 70'. A threshold voltage corresponding to the duration of pulse 85 is formed for instance by integration of this pulse, and is applied to a relaxation circuit of the control device 86, response of this relaxation circuit for producing an output pulse upon receipt of the pulse 70 being quicker when a high threshold potential is produced by a long pulse 85. Any electronic distortion of the reference pulse 70 in the channel 73, 80, 81, 82 and 83 is practically neutralized by this control equipment in that the said threshold potential controlling the instant of transmission of the effective reference pulse 70'' is reduced when the pulse 70 has been flattened or reduced in voltage during its passage through the above electronic devices. After forming and limiting the reference pulses 70'' in a circuit 87 of the installation, such pulses are applied to the electronic switch 79 which is opened at the arrival of pulse 70'' thereby breaking the train of multiplied pulses 69 equally transmitted to the electronic switch.

The train of pulse 69' passing through the electronic switch 79 is transmitted to a pulse counter 88 and to a computing apparatus. It will be clear from the above description that during each measuring period a number of pulses 69' will be transmitted to the counter 88 and to the computor, corresponding to ten times the number of divisions of the scanned scale 67 or 68 located between the beginning of such scale and reference sign 65 projected into the scanned scale. Therefore, a number of pulses forms the base of the measurement whereof the smallest unit corresponds to $\frac{1}{10}$ of the division of scale portions 67 and 68, that is, to $\frac{1}{1000}$ mm.

The trains of pulses 69' are transmitted to three decimal counters 90, 91 and 92 whereby a pulse is transmitted from each counter to the next after reception of 10 pulses. Decimal counters of this type are well known in the art and do not require further explanation. Each of the counters 90 and 91 has nine output conductors I to IX, while the counter 92, although of decimal construction, has only output conductors on positions III to VIII. The said output conductors of counters 90 and 91 are connected to contacts 93 of selectors 94 and 95 respectively. The selectors 94 and 95 are of similar construction, each having a pair of brushes 97 and 98 shifted by one unit step and mechanically interconnected for common displacement by stepping relays 30. The contacts 93 of selectors 94 and 95 may be connected to slip rings (shown as straight bus bars) 99 and 100 by means of said brushes 97 and 98. The selectors 94 to 96 are shown in development although in practice such selectors are of circular shape as shown for selectors 35 in FIG. 1. The selector 96 has three brushes 101, 102 and 103 adapted to connect the output conductors of counter 92 to slip rings or bus bars 104 and 105 respectively and to connect further slip rings or bus bars 107 and 108 with a slip ring or bus bar 106. Two separate contacts 109 and 110 of selectors 94 and 95 and the bus bars or slip rings 99 and 100 of such selectors are connected to computing and comparing units 111 and 112 comprising each two flip-flop circuits designated FF1 to FF4 respectively. The bus bars 104 and 105 of selector 96 are connected to another computing and comparing unit 113 comprising flip-flop circuits FF5 and FF6.

Outputs B of flip-flops FF1, FF3 and FF5 and outputs A of flip-flop FF2, FF4 and FF6 are connected to a common conductor 114 by means of diodes 115–120. Conductor 114 is connected to an amplifier 121 adapted to produce a locking signal for the machine table when there appears a negative signal on conductor 114. Outputs A of flip-flop FF1, FF3 and FF5 are connected to conductors 125 to 127 by means of diodes 128–130, these conductors being connected to negative potentials by resistors and to a common conductor 131 by means of diodes 132 to 134. Similarly, outputs B of flip-flops FF2, FF4 and FF6 are connected to a common conductor 135 through diodes 136, 137, and 138 respectively, conductors 139, 140 and 141 respectively and diodes 142, 143 and 144 respectively, conductors 139–141 being connected to a negative potential through resistors.

Figure 6:
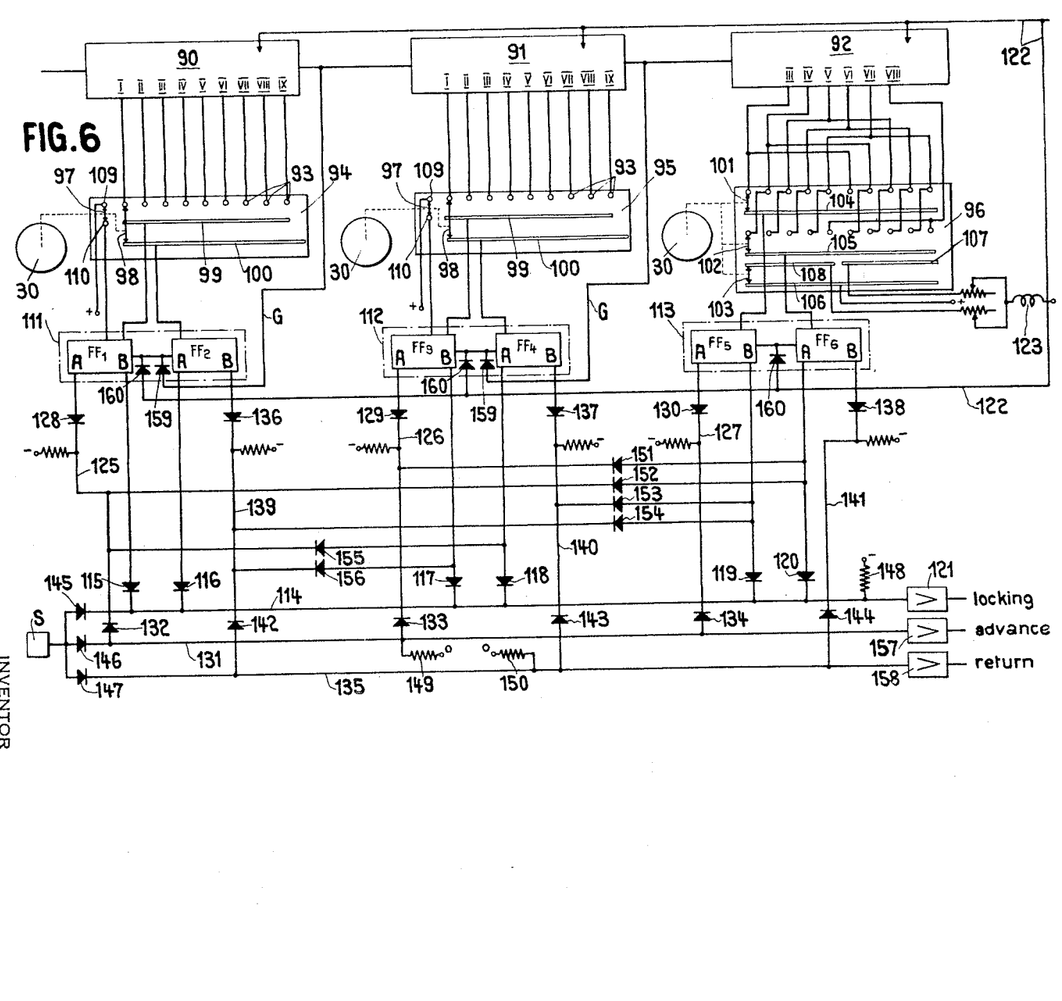

Conductors 114, 131 and 135 are connected to the output of a one-shot multivibrator S by means of diodes 145 to 147. Conductor 114 is connected to a negative potential by means of a resistor 148. Conductors 131 and 135 are connected to zero potential by means of resistors 149 and 150. Interlocking diodes 151 to 156 are connected between outputs B of flip-flops FF3 and FF5 and outputs A of flip-flops FF4 and FF6 and conductors 125, 126, 139 and 140 as shown in FIG. 6. Conductors 131 and 135 are connected to the input of amplifiers 157 and 158 respectively adapted to produce an advance and return signal respectively when the input conductor 131 or 135 is negative.

The flip-flops of units 111 and 112 are controllable by the output signal of the associated counters 90 and 91 respectively through lines G and diodes 159. All of the flip-flops are further controllable by a reset signal applied through a reset conductor 122 and diodes 160. In the reset or zero position of the flip-flops their output A is negative and output B is at zero potential. Any signal at input conductors 99, 100, 104 and 105 drives the flip-flop connected thereto into a condition wherein output A returns to zero potential and output B turns negative. The output impedance of the flip-flops is relatively low as compared with the value of the loading resistors of lines 125–127, 139 to 141, 114, 131 and 135.

A reset pulse may also be transmitted to counters 90 to 92 through conductor 122, for resetting all the counters into zero position. The bus bars or slip rings 106, 107 and 108 are connected by conductors and adjustable potentiometers without reference numerals in FIG. 6 to a schematically illustrated deflecting coil 123 for vertical deflection of the electron beam of the picture tube 64 (FIG. 2). The picture tube 64 has another deflecting coil 124 for periodically deflecting the electron beam in horizontal direction.

Figure 5:
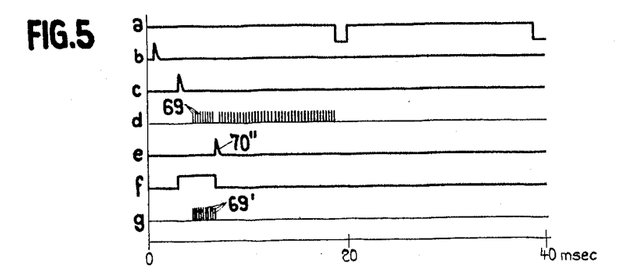
FIG. 5 illustrates the chronological sequence of different important operations of the computing and comparing apparatus,
FIG. 6 schematically illustrates the digital computing and comparing circuit and
FIGS. 7 and 8 schematically illustrate a modification.

Operation of the fine adjusting equipment is as follows: The periodic scanning of the picture projected onto the screen of the picture tube 64 an initiation of the computing and comparing operations is synchronized by the alternating current of the mains, whereby scanning the scale and counting and storing the pulses is effected during a first and computing and adjustment of the machine table is effected during the second of two succeeding half waves of the alternating current. Therefore, assuming an A.C. frequency of 50 cycles, duration of a full operation period will be 40 msec., the said measuring period and computing period having each a duration of 20 msec. These values are shown in FIG. 2 and FIG. 5 which illustrates the chronological sequence of the most important phases of the operation. Initiation of the horizontal deflection of the scanning electron beam of the picture tube is assumed to coincide with the beginning of the full operating cycle. Scanning is effected twice per operating cycle, but counting of the pulses and computation thereof is effected but once per operating cycle.

The control pulses derived from the A.C. voltage are indicated at a in FIG. 5 and in FIG. 2. As shown in diagram b of FIG. 5 the control device synchronized by the alternating current of the mains soon transmits a pulse through conductor 122 (FIG. 6) for resetting the counters 90 to 92 and flip-flops FF1 to FF6 into zero position whereby they are prepared for counting and computing the next train of pulses 69'. Some 3 msec. later the control device transmits a closing pulse (diagram c of FIG. 5) through a conductor shown at the left of the electronic switch 79 in FIG. 4 for closing the electronic switch, so that the train of pulses 69' arriving somewhat later will be transmitted through the electronic switch until it is reopened by the pulse 70" (diagram e in FIG. 5) for breaking the train of pulses at a predetermined place and at a predetermined time respectively. Diagrams f and g of FIG. 5 show the closed period of the electronic switch and the train of pulses 69' transmitted through the closed electronic switch.

As already stated above, the number of pulses 69' transmitted through the electronic switch is a direct measure for the distance between the beginning of the scanned scale portion 67 or 68 and of the reference line 65 projected into this scale portion. Although this measure is systematically changed by a predetermined value by the delay imparted to the pulses 69 in the delay circuit 76, this only means a slight shifting of zero without importance because in practice the reference point is not necessarily the zero position of the machine table but the position of a predetermined point of the work spanned onto the table. The delay has the effect that only absolutely clear pulses 69 not disturbed in any way by the neighbourhood of the reference sign 65 and reference pulse respectively, are counted.

The train of measuring pulses 69' after having passed through the electronic switch 79 is applied to the counters 90 to 92 which had been reset to zero at the beginning of the cycle as explained above, and such counters will assume conditions so that the units' digits are indicated by counter 90, the tenths are indicated by counter 91 and the hundredths are indicated by counter 92. Since the pulses 69' correspond to a length of 1/1000 mm. the counter 90 indicates the thousandths, the counter 91 the hundredths and the counter 92 the tenths of a millimeter. The brushes of selectors 94–96 are displaced into preselected positions in substantially the way explained above for selectors 35. According to the position of the selectors and the end position of the associated counters different conditions will be transmitted from the selectors to the computing and comparing units 111–113.

It is assumed that a position of 6.4585 cm. is to be adjusted. The machine table 1 has already attained the coarse adjustment of 6.45 cm. in the manner explained above. The selectors 96, 95 and 94 are displaced into positions V, VIII and V respectively. In selector 96 brush 103 contacts bar 107, brush 102 is connected to the output terminal IV of counter 92 and brush 101 is connected to the output terminal III of counter 92.

Due to the connection between brush 103 and bar 107 the beam of the picture tube 64 is deflected to its lower scanning position by proper adjustment of the variable resistor connected between bar 107 and deflecting coil 123, so that the lower scale portion 68, that is the range V–IX is scanned since a rest of .585 mm. or more than .5 mm. has been selected. As assumed the machine table has stopped in position 6.45 cm. at the end of the coarse adjustment so that the reference sign 65 projected into scale portion 68 will be shifted to $85/1000$ mm. to the left with reference to the selected value. This means that the number of pulses 69' will be by 85 pulses below the due number.

Assuming that the scale portion 68 for the higher measuring range had a length of 0.5 mm., no pulses would be produced in the present case where the table has just stopped in position 6.45 cm. This is the reason why the scale portions 67 and 68 are extended beyond their effective measuring range, whereby a corresponding correction is made in the counting and computing equipment in the manner explained below. In the present example the scale portions 67 and 68 are extended at each and beyond the measuring range by 0.3 mm., that is by 30 scale divisions corresponding to $300/1000$ mm. Therefore, the total length of each scale portion corresponds to 1.1 mm. although the real measuring range of such scale portions is only 0.5 mm.

For the above example it is clear that for a position of the machine table of 6.4500 cm. 300 pulses 69' will arrive because the reference sign 65 exactly coincides with the effective zero line of scale portion 68. The counters 90 and 91 will therefore arrive in their zero position and counter 92 will arrive in position III. During this first measuring period of 20 msec. a positive signal is applied to diodes 145–147 by the one-shot multivibrator S so that conductors 114, 131 and 135 are maintained at a positive potential and cannot control any of the locking, advance or return amplifiers. However, at the end of the first half of the operating cycle of 40 msec. the one-shot multivibrator S is operated to apply a negative signal to diodes 145–147 so that any of conductors 114, 131 or 135 may become negative for control. Unit 113 receives a pulse through brush 101 and bar 104 of selector 96 which is in position V.

Flip-flop FF5 is reversed from its zero position by this pulse so that its output B turns negative. Output A of flip-flop FF6 which is in its zero position, is negative and therefore, none of the interlocking diodes 151 to 154 will prevent any of conductors 125, 126 139 and 140 from turning negative. As mentioned above, counters 90 and 91 have returned to zero and have reset units 111 and 112 into zero condition by the last counting pulses transmitted to the next decimal. Flip-flops FF1–FF4 are therefore in their zero condition wherein outputs A are negative and outputs B are positive. Conductors 125 and 126 are thus allowed to turn negative and conductor 131 will equally turn negative thereby controlling amplifier 157 for producing an advance signal.

The machine table is thus advanced during the second half of the operating period and this condition will persist for all succeeding operating periods until a table position of 6.4580 cm. is attained. When this position is reached, trains of 380 pulses 69' will now be transmitted to the counters 90 to 92 so that counter 92 still arrives at position III, counter 91 arrives at position VIII and counter 90 arrives at position 0. Under these circumstances the output VIII of counter 91 will become operative so that a pulse is transmitted to flip-flop FF3 of unit 112 through brush 97 and bar 99 of selector 95 which is also displaced to position VIII. The unit 112 will thus produce a locking condition, that is, output B of flip-flop FF3 and output A of flip-flop FF4 are negative.

The next unit 111 is thereby rendered operative because diodes 155 and 156 will allow negative signals on 125 and 139 and will produce an advance signal because it is in zero condition since the associated selector 94 is in position V and the associated counter 90 is in position 0. The table 1 further advances. Since a final adjustment by $5/1000$ mm. is still to be effected, the table will be displaced at very low speed and intermittently during the second half of each cycle of the mains frequency in order to avoid oscillation about the position to be adjusted. The table will thus advance by $5/1000$ mm. until 385 pulses 69' are produced and the counter 90 will take its final position V. For this position of the counter a pulse is transmitted through brush 97 and the upper bar 99 of the associated selector 94, so that unit 111 will produce a blocking signal. After some delay during which no new adjusting commands have been transmitted a final signal is transmitted for shutting down measuring and adjusting installation and for mechanically locking the machine table 1 in the adjusted position.

Since the measuring and adjusting range of the fine adjusting equipment is always limited to 0.5 mm. the counting capacity of counter 92 may be limited to 0.5 mm. or to five positions respectively. The delay or zero shifting of 300 pulses is obtained by omitting connections to positions 0 to II of counter 92. By crossing the connections between outputs III to VIII of counter 92 to the contacts of selector 96 similar measuring and computing conditions are obtained for each measuring range shifted by 0.5 mm. and associated with scale portions 67 and 68. In accordance with the position of selector 96 scanning of the one or other of scale portions 67 or 68 is automatically adjusted by commands transmitted through bars 106, 107 and 108 and the variable resistors connected in series therewith.

Referring to the above example it will be evident without further explanation that any fine adjustment may be obtained by advance or return motions of the machine table from the coarse adjustment. Attention is only drawn to the fact that the computing units 111 to 113 always respond to the last pulse they receive whereby earlier conditions of such units are cancelled. It will be clear that the brushes 98 and 102 respectively adapted to transmit return commands or signals are at a position exceeding the actual selector position by one unit step and therefore are connected to an output terminal of the associated counter exceeding the selector position by one unit step. Consequently, a signal will be transmitted through the return brushes 98 and 102 to flip-flops FF2, FF4 or FF6 respectively whenever a number of pulses arrives in one predetermined decimal exceeding the position or displacement of the associated selector, and since this return pulse is the last pulse received, the associated computing units 111, 112 or 113 will remain in return condition and will transmit a return signal thereby causing return motion of the machine table.

Only when the counters run to a position equal to the position of the associated selector no signal will be transmitted through the return brushes 98 or 102 and the last signal will be the stop signal received through the stop brushes 97 and 101 and flip-flops FF1, FF3 or FF5 respectively, receipt of a last signal through such brushes being proof that the correct position has been attained. When the pulse counter does not attain the position of the selector, no signal will be transmitted through any of the brushes and the associated unit which had been reset to zero during the previous passage of the counter through its zero position, remains in its reset or normal condition for which an advance signal is issued. Therefore, the computing and comparing equipment shown in FIG. 6 is based on a very simple and logical principle although relatively complicated operating conditions for units 111 to 113 seem to result. When any of selectors 94 or 95 is in its zero position shown in FIG. 6, flip-flop FF1 or FF3 of the associated unit 111 or 112 respectively is maintained in its zero condition by a positive potential applied through contacts 109 and 110 of the selector.

Each of the coarse and fine adjusting installations comprises a decade associated to a tenth of a millimeter. The selectors of such decades may directly be coupled and may be controlled by the same stepping relay 30. A common adjustment of all selectors either by means of a punched card or by hand is possible.

The installation shown in the drawing operates rapidly and extremely reliably. The adjustment by any desired stroke takes a few seconds. Intensive experiments during a period of more than one month have not shown a single misadjustment so that the precision of $1/1000$ mm. may be warranted. Preselection of the adjustment is extremely simple. For carrying out predetermined programs for working a piece, automatic selection of succeeding positions by means of punched cards is possible. Of course commutator means may be provided for use of the same equipment for adjustment in different directions or for selectively and successively adjusting different machine parts.

In order to reduce the influence of unsharp boundary zones of the division lines and reference signs projected onto the screen of the picture tube, the scanning beam of the picture tube may be deflected in vertical direction at a high frequency during its horizontal scanning motion in order to scan a mean position of the boundary lines of the scale divisions instead of one single point thereof.

Instead of using separate coarse and fine adjusting equipments, the full adjusting range of 1 dm. might be covered by the equipment shown in FIG. 6. A modified embodiment of this type is shown in FIGS. 7 and 8. A second scale 63a would be provided at the side of scale 63 of the machine table and this scale would be displaced at a speed of $1/100$ of the speed of the machine table and of scale 63 respectively. This second scale which may be called a decimeter scale has one single reference sign 65a similar to the reference signs 65 of scale 63 and this single reference sign will be projected to the zero point of scale portion 67 when the machine table is in zero position.

For coarse adjustment in the decimeter, centimeter and millimeter ranges the optical system or the scales 63 and the said auxiliary decimeter scale are shifted, for instance by means of a prism P displaceable into and out of the optical path of the picture-forming system for scales 63 and 63a so that the reference sign of the decimeter scale is projected onto the tube. Adjustment in the ranges of scale portions 67 and 68 for 0–5 cm. and for 5–10 cm. respectively is possible exactly in the same manner as adjustment was explained above for the range of 0–0.5 mm. and 0.5 to 1 mm. No changes at all are required in the equipment shown in FIG. 6 and only an additional scale which must not be driven at extremely high precision and means for alternatively producing an optical picture of the one or other scale are required.

With this arrangement, unit steps are stored in the selectors 94 to 96 corresponding to tenths of a millimeter, millimeters and centimeters respectively. As an example, when the above adjustment of 0.645 85 decimeters (=6.45 85 cm.) is to be effected, the selectors 94 to 96 are first displaced into positions V, IV and VI respectively. Since the adjusting equipment of FIG. 6 is able to control the adjustment at a precision of three decimals the coarse adjustment will be obtained at a precision of $\frac{1}{10}$ of a millimeter.

At the end of this coarse adjustment the selectors 94 to 96 are again adjusted to positions V, VIII and V respectively for effecting the fine adjustment exactly in the manner described above at a precision of $\frac{1}{1000}$ mm. Of course the new adjustment of the selectors 94 to 96 is not practically possible and therefore, another set of selectors would preferably be provided, it being possible to selectively connect the one or other set of selectors between the counters 90 to 92 and the units 111 to 113 by suitable commutating means. In this modification of the device there is also a common decade for the tenths of a millimeter for the coarse and fine adjusting range in order to guarantee an absolutely reliable fine adjustment on the base of a coarse adjustment which is effected at a precision somewhat exceeding the theoretically required accuracy.

It is a particular advantage of the measuring and adjusting systems described above that measurement and preselection are effected by digital methods which are absolutely independent from the constance of the potential of the electric sources. The precision is only limited by the precision of the optical projection of the scales and reference signs and by the resolving power of the picture tube. With the above values of the optical magnification and with a usual picture tube a precision of $\frac{1}{1000}$ mm. may be warranted.

Instead of a coarse adjustment of the type described with reference to the drawings, another well known system for coarse adjustment of a machine part, for instance a follower system comprising an electric bridge circuit may be used, provided that such a system allows coarse adjustment at a precision sufficient for subsequent fine adjustment. In such a bridge system, one arm of the bridge is variable by preselectable resistance values while the other bridge arm is formed by portions of a potentiometer mechanically coupled with the machine table.

The kind and disposition of the scales 67 and 68 and of the scale 63 of reference signs 65 is only shown by way of example. The scale portions 67 and 68 may for instance be applied to the screen of the picture tube and may uniformly be illuminated.

Of course it is not necessary to operate in a decimal system for fine and coarse adjustment. If desired the preselected values may be transposed into a binary or a biquinary system. For adjustment in non-metric and non-decimal measuring systems the decimal selectors and counters shown in the drawings may be replaced where required by counters and selectors having any suitable number of unit steps, for instance three or twelve steps.

What I claim is:

1. A device for automatically adjusting a machine part into position comprising a support, a machine part, means for moving the machine part with respect to the support, a movable scale mounted for movement with the machine part, a stationary scale fixed to the support, an electronic picture tube having a screen, a fixed optical image-forming system including means for producing an enlarged image of at least a portion of said scales on said screen, means associated with said picture tube for intermittently scanning said image by one single deflection of the electron beam, means providing a digitally selected value, a computing circuit including means for comparing a number of pulses produced by said picture tube and corresponding to a number of scale divisions of said stationary scale determined by the relative positions of said movable and stationary scales with said digitally preselected value, and means responsive to said comparison for controlling said means for moving the machine part with respect to the support.

2. A device according to claim 1 in which the means for storing a preselected value are selectors, and pulse counters are provided as storage means for digital indication.

3. A device according to claim 2 in which one selector and one pulse counter are individually associated for each unit of length, each selector including two brushes spaced by one unit step, such brushes being connected to the counter output, whereby the one brush runs to the preselected place and the other brush runs beyond the preselected place by one unit step, said control means operative by signals transmitted through the said brushes for the operations of advancing, retracting, and stopping the machine part.

4. A device according to claim 1 in which the pictures of the divisions (or scale lines) of the movable scale have optical properties differing from the optical properties of the divisions of the stationary scale whereby electrical pulses of different characteristics are produced when the respective images of divisions are scanned.

5. A device according to claim 1 in which two or more movable scales are included displaced at different speeds in accordance with the displacement of the machine part, and optical system adjusting means is included for selectively forming an image of one of said movable scales, so that adjustment is had in ranges of different precision by one single scanning and adjusting equipment according to the speed of the scale of which an image is produced.

6. A device according to claim 1 in which is incorporated means for fine adjustment including means for digital preselection and digital comparison of the preselected value with the actual position of the machine part, and means for coarse adjustment including means for digital preselection and a non-digital follower system.

7. A device according to claim 1 in which means is incorporated providing that each unit step of said digital preselectors is subdivided into three partial steps, each selector being advanced within the selected unit step by more or less partial steps according to the position of the selector associated with the smaller measuring unit.

8. A device according to claim 1 in which means is incorporated deflecting the scanning electron beam of the picture tube at a high frequency transversely to its linear deflection along said scales in order to scan a mean position of the marginal portions of the scale divisions.

9. A device according to claim 1 in which two overlapping stationary scale portions are incorporated staggered in a direction transversely to the longitudinal extension of the scale portions, the total length of the scale portions exceeding the distance between neighboring divisions of said movable scale, and commutator means for selectively deflecting the said electron beam along one of the said stationary scale portions according to the effective measuring range.

10. A device according to claim 9 in which said stationary scale portions are fixed in the optical system.

11. A device for automatically adjusting a machine part into a position corresponding to a digitally preselected value, comprising a movable scale, a stationary scale, both scales having divisions, means for relatively displacing said stationary and movable scales in accordance with the displacement of the machine part, a picture tube, optical means for producing an image of at least a portion of each of said scales on the screen of said picture tube, means for repeatedly electronically scanning said image by means of a cathode ray of the picture tube thereby producing electric pulses corresponding to said scale divisions, means for repeatedly counting the number of a train of electric pulses corresponding to said stationary scale divisions produced prior to the occurrence of a pulse corresponding to a division of said movable scale, means providing a digitally preselected value, means for repeatedly comparing said counted pulses with the said digitally preselected value, and means for adjusting the said machine part in accordance with any difference between said number of pulses and said preselected value.

12. A device according to claim 11 in which is incorporated optical means adapted to optically superpose the said stationary and movable scales in one image, and means for deflecting the electron beam along a substantially straight line.

13. A device according to claim 11 in which is incorporated an electronic pulse multiplier connected between said picture tube and said counting means so that electric pulses corresponding to the scale divisions of said stationary scale are electronically multipled thereby obtaining a further increase of precision of adjustment of said machine part.

14. A device for adjusting a machine part comprising a movable divided scale mounted on said machine part, at least one stationary divided scale of a length corresponding substantially to the interval between adjacent division lines of said movable scale, an electronic picture tube having a screen, stationary optical means for producing an image of said stationary scale and of at least one division of said movable scale on the screen of said picture tube, a digital counter for electronically counting and storing electric pulses, selector means for digitally adjusting and storing a value to which the machine part is to be adjusted, means associated with said picture tube for deflecting its beam along said image formed on its screen for producing electric pulses at the tube output when scanning said stationary and movable scale divisions, a computing circuit for comparing the condition of said counter and selector means respectively, means for adjusting said machine part in accordance with differences of the condition of said counter and selector means, and cycle control means for repeatedly resetting said counter into zero position.

References Cited by the Examiner
UNITED STATES PATENTS

| | | | |
|---|---|---|---|
| 2,311,142 | 2/1943 | Turrettini | 192—143 |
| 2,393,186 | 1/1946 | Potter | 340—351 |
| 2,494,441 | 1/1950 | Hillier | 250—49.5 |
| 2,886,753 | 5/1959 | Abbott | 318—28 |
| 2,969,490 | 1/1961 | Anderson et al. | 318—162 |

JOHN F. COUCH, *Primary Examiner.*

MALCOLM A. MORRISON, *Examiner.*